United States Patent [19]

Weiland

[11] 4,450,792

[45] May 29, 1984

[54] DEVICE FOR ARRESTING THE HIND LEG OF AN ANIMAL

[75] Inventor: Werner Weiland, Bendorf, Fed. Rep. of Germany

[73] Assignee: Rheintechnik, Weiland & Kasper KG, Neunkichen, Fed. Rep. of Germany

[21] Appl. No.: 334,726

[22] Filed: Dec. 28, 1981

[30] Foreign Application Priority Data

Jan. 22, 1981 [DE] Fed. Rep. of Germany ....... 8101476

[51] Int. Cl.³ .......................... A01K 15/00; B68B 1/14
[52] U.S. Cl. ...................................... 119/126; 119/128
[58] Field of Search ....................... 119/126, 128, 151; 24/249 LS, 248 SA; 292/256.67

[56] References Cited

U.S. PATENT DOCUMENTS

| 66,846 | 7/1867 | Hyatt | 119/128 |
| 205,116 | 6/1878 | Mead | 119/128 X |
| 859,131 | 7/1907 | Snearly | 119/128 |
| 3,566,616 | 3/1971 | Benedict, Jr. | 24/249 LS X |
| 3,769,940 | 11/1973 | Jansen-Vanbeek et al. | 119/126 |

FOREIGN PATENT DOCUMENTS 179253 11/1935 Switzerland ...................... 119/126

Primary Examiner—Robert P. Swiatek
Attorney, Agent, or Firm—Max Fogiel

[57] ABSTRACT

A device for arresting the hind legs of animals, such as cattle, has a ring which is placed about the leg just above the leg joint, and within the ring a pressure member is movable which can be pressed against the Achilles tendon of the leg.

3 Claims, 3 Drawing Figures

U.S. Patent     May 29, 1984     4,450,792
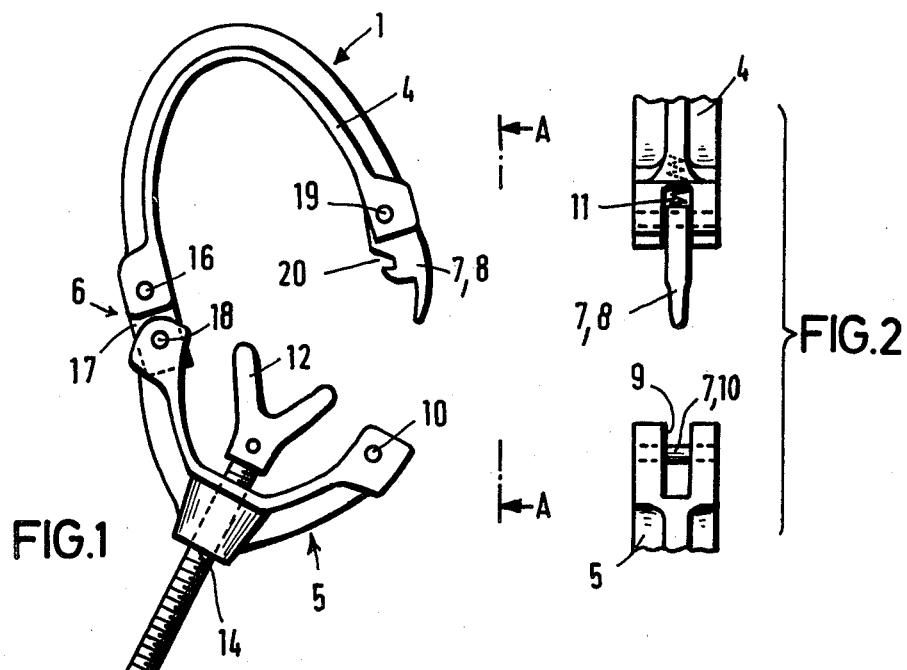
FIG.1
FIG.2
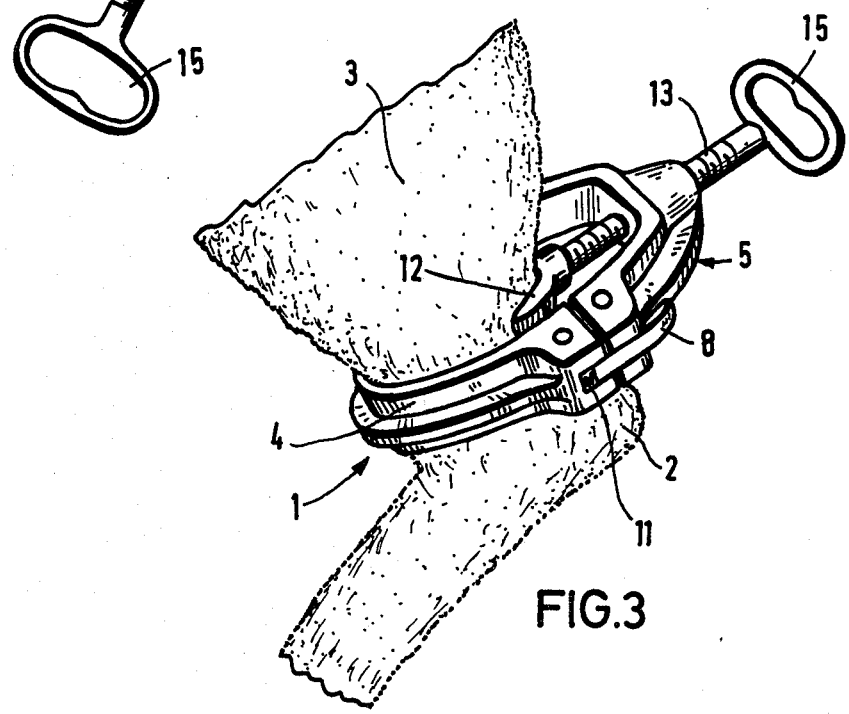
FIG.3

DEVICE FOR ARRESTING THE HIND LEG OF AN ANIMAL

BACKGROUND OF THE INVENTION

The present invention relates to an animal arresting device.

More particularly, the invention relates to a device for arresting a hind leg of an animal, especially—but not exclusively—of cattle.

It is quite frequently necessary to immobilize a hind leg of one of the larger animals. For example, in the case of cattle it may be necessary to treat the foot or the hoof of one of the hind legs. To do this it is known to provide a clamp having a hook which has a V-shaped part. This part is placed about the hind leg a short distance above the leg joint and a threaded bolt is then turned until the V-shaped part engages the leg at both sides of the Achilles tendon. Further turning of the bolt then causes the V-shaped part to press against the Achilles tendon and eventually this pressure causes the animal to raise the leg, so that the hoof is now accessible. Moreover, such treatment is without danger since the clamp holds the leg against kicking.

A disadvantage of these prior-art clamps is that they are secure against sliding on (relative to) the leg only after the V-shaped part presses relatively strongly against the Achilles tendon. Should the animal decide to kick before the bolt is sufficiently turned to reach this degree of tightness, then there is the danger that the clamp may slip and the operator may receive the kick and become injured.

SUMMARY OF THE INVENTION

It is, therefore, a general object of the invention to overcome the disadvantages of the prior art.

A more particular object is to provide an improved device of the type under discussion, which avoids the prior-art drawbacks.

Still more specifically, it is an object of the invention to provide a clamp of the kind under discussion, which, once applied to a hind leg of an animal, cannot unintendedly slip against and which from the moment of application exerts an immediate pressure upon the Achilles tendon to make kicking impossible or substantially so.

In keeping with these objects and with still others which will become apparent hereafter, one aspect of the invention resides in a device of the character described. Briefly stated, this may comprise a ring-shaped part to be placed about the animal hind leg shortly above the leg-joint and a pressureexerting part movable relative to the ring-shaped part and adapted to bear upon the leg's Achilles tendon.

The animal hind leg is known to be of oval cross-section. Accordingly, it is advantageous to make the ring of the device also of oval shape. Preferably it is provided at the rear side of the leg, located about on the longest ring axis, with an opening (preferably with an internal thread) through which a threaded bolt with an outer bolt portion is extended. The inner free end of this bolt is located in the inner space of the ring and turnably carries the part to be pressed against the Achilles tendon. This part is advantageously V-shaped, having its open side facing towards the tendon. The outer part of the bolt advantageously carries a hand grip so that the bolt can be easily turned until the V-shaped part presses against the tendon.

Application of the ring to the leg can be facilitated by making it of two parts which at one side are pivoted together and at the opposite side are provided with a snap-lock. It is advantageous if the separation of the (oval) ring is parallel to the shortest ring axis. Then, before the device is applied to the leg, the V-shaped part is pushed forward (with the ring in open position) so that on application of the ring to the leg it will already have contact with the Achilles tendon. Thereafter, the two ring halves are placed about the leg and pushed together to latch the snap lock. The ring is now already immovably seated on the leg and the bolt can then be turned to press the V-shaped part more firmly against the tendon, until the animal raises the leg.

Suitable as the snap-lock is especially a hook which is resiliently mounted against the pressure of a spring in a slot of one of the ring parts, and which in latched condition embraces a bolt that is arranged in a slot of the other ring part.

The invention will hereafter be described with reference to an exemplary embodiment. However, it is to be understood that this is for purposes of explanation only and not to be considered limiting in any sense.

BRIEF DESCRIPTION OF THE DRAWINGS

FIG. 1 is a top-plan view of the device according to the invention, with the ring in open position;

FIG. 2 is a view taken along A—A of FIG. 1; and

FIG. 3 shows the device applied to an animal hind leg.

DESCRIPTION OF A PREFERRED EMBODIMENT

The device in FIGS. 1—3, essentially a clamp, has a ring 1 which is to be placed about an animal hind leg closely above the leg joint, and which is provided with a part 12 to be pressed against the Achilles tendon. Part 12 is freely turnably mounted on the inner end of a threaded bolt 13 whose external threads mesh with the internal threads in an opening 14 of ring 1. The outer end of bolt 13 preferably carries a handle 15 to facilitate turning of the bolt.

In operation, the ring 1 is placed about the animal's leg 3, just above the leg joint 2. In keeping with the oval leg cross-section, the ring 1 is of oval shape and the opening 14 extends about parallel to the longest axis of the ring, being located (in use) at the rear of the leg.

To facilitate application of the device, the ring 1 is of two parts, i.e. it is split normal to its longest axis and parallel to its shortest axis into two parts 4 and 5. These are pivoted together at one side of the ring 1 by a hinge 6; at the opposite side, they can be joined by a snap-lock 7. Hinge 6 is formed in that part 4 which is provided, in its area facing part 5, with a not-illustrated slot in which a bolt 16 mounts a tongue 17; the latter enters into an also not-illustrated slot of the adjacent region of the other part 5 where it is pivotally connected to a bolt 17.

The snap lock 7 is provided by forming part 4 with a not-illustrated slot in which hook 8 is mounted via a bolt 19 so that it can pivot out against the force of a spring 11. Spring 11 is mounted at the outer side of part 4 before the end of hook 8 in a recess, as shown at the top of FIG. 2. The region of part 5 which faces part 4 has a slot 9 in which a bolt 10 is mounted normal to the plane of movement of hook 8. When the two parts 4 and 5 are placed about an animal leg and pressed together, the curved end of hook 8 engages bolt 10, hook 8 is pressed inwardly until tongue 20 clears bolt 10, and hook 8 then embraces bolt 10 in latching relationship.

To apply the device to the animal, the snap-lock 7 is opened by pivoting hook 8 outwardly and pulling parts 4 and 5 apart. Now handle 15 is turned until bolt 13 and part 12 are so far advanced that part 12 will press against the Achilles tendon as soon as the ring 1 is placed on the leg. The clamp is now placed about the leg 3, just above the joint 2, so that part 12 presses against the tendon and the parts 4, 5 are pressed together to latch the snap-lock 7. Thereafter, the bolt 13 and part 12 are further advanced with handle 15, until the animal raises its leg.

The leg is captured against kicking from the moment lock 7 snaps in place, so that there is no danger to the operator.

While the invention has been described with reference to an exemplary embodiment, it will be understood that it is capable of various modifications, all of which are intended to be encompassed within the scope of the appended claims.

I claim:

1. Device for arresting a hind leg of an animal, especially cattle, comprising: a ring-shaped part to be placed about the animal hind leg shortly above the leg-joint; a pressure-exerting part movable relative to the ring-shaped part and adapted to bear upon the leg's Achilles tendon; said ring-shaped part having an oval shape; said ring-shaped part comprising two articulately connected sections; a hinge connecting said sections at one side of said ring-shaped part; a snap-lock for uniting said sections at an opposite side of said ring-shaped part; said ring-shaped part being separated into said sections laterally of the hind leg to be arrested; one of said sections having a projecting spring-biased hook, and the other section having a slot provided with a bolt embraceable by said hook, said hook and slot comprising said snap-lock, the leg of the animal being captured against kicking from the instant that said snap-lock locks, so that danger to a user of the device is prevented.

2. Device as defined in claim 1, wherein said hook can be deflected into said one section against the pressure of a spring.

3. A device as defined in claim 1, wherein said oval shape conforms substantially to the shape of the animal's leg, said pressure-exerting part being placed at the rear side of the leg and located about on the longest ring axis, said ring-shaped part having an opening with an internal thread, a threaded bolt extending through said opening and into the inner space of said ring-shaped part and carrying a substantially V-shaped pressure-applying element in said inner space for contacting the tendon of the animal's leg, said bolt having an outer part carrying a hand grip for turning said bolt and thereby pressing said element against the tendon, said two sections of said ring-shaped part having a separation parallel to the shortest ring axis, said V-shaped element being pushed forward when said ring-shaped part is in open position so that when the ring-shaped part is applied around the animal's leg said V-shaped element contacts immediately the tendon, whereby said ring-shaped part is immovably seated on the leg when said snap-lock is locked.

* * * * *